United States Patent

Kim

[11] Patent Number: 5,615,310
[45] Date of Patent: Mar. 25, 1997

[54] CIRCUIT FOR RESOLUTION MATCHING

[75] Inventor: Yong-Geun Kim, Suwon, Rep. of Korea

[73] Assignee: SamSung Electronics Co., Ltd., Suwon, Rep. of Korea

[21] Appl. No.: 358,172

[22] Filed: Dec. 16, 1994

[30] Foreign Application Priority Data

Dec. 18, 1993 [KR] Rep. of Korea ............... 28372/1993

[51] Int. Cl.$^6$ ...................................................... G06F 15/00
[52] U.S. Cl. ............................. 395/102; 395/115; 395/110; 395/508; 395/520; 345/213; 345/192; 345/201; 358/409; 358/443
[58] Field of Search ..................................... 395/101, 102, 395/107, 109, 110, 115, 116, 162, 164–166; 358/409, 410, 296, 298, 451, 443; 345/127, 192, 132, 194, 213, 195, 201

[56] References Cited

U.S. PATENT DOCUMENTS

| | | | |
|---|---|---|---|
| 3,991,266 | 11/1976 | Baer | 348/385 |
| 4,233,636 | 11/1980 | Harbaugh | 358/480 |
| 4,589,029 | 5/1986 | Torimaru | 345/127 |
| 4,644,409 | 2/1987 | Fuchs | 358/443 |
| 4,851,826 | 7/1989 | Davus | 345/132 |
| 4,992,888 | 2/1991 | Nagashima | 358/410 |
| 5,038,218 | 8/1991 | Matsumoto | 395/137 |
| 5,068,731 | 11/1991 | Takeuchi | 348/581 |
| 5,122,789 | 6/1992 | Ito | 345/130 |
| 5,123,082 | 6/1992 | Shimada | 395/102 |
| 5,165,073 | 11/1992 | Shaklee et al. | 358/451 |
| 5,239,313 | 8/1993 | Marko et al. | 358/298 |
| 5,283,662 | 2/1994 | Nakajima | 358/409 |
| 5,321,432 | 6/1994 | Ishikawa et al. | 358/298 |

FOREIGN PATENT DOCUMENTS

| | | |
|---|---|---|
| 60-174568 | 9/1985 | Japan . |
| 4-282962A | 10/1992 | Japan . |

*Primary Examiner*—Kee M. Tung
*Attorney, Agent, or Firm*—Robert E. Bushnell, Esq.

[57] ABSTRACT

A circuit for matching resolutions of a data transmitted from a host computer and an image forming apparatus, the image forming apparatus including engine unit for printing the data on paper and video controller for synchronizing the data to be printed to a horizontal synchronizing signal and a video clock received from the engine unit and for serially transmitting the data to the engine unit by the one dot, is disclosed. A resolution matching circuit of an image forming apparatus having transverse direction enlargement portion for generating a second video clock by converting the frequency of the video clock received from the engine unit corresponding to the rate of the resolutions and for providing the second video clock to the video controller and longitudinal direction enlargement portion for temporarily storing a data of an odd number scanning and for providing the stored data to the engine unit as a data of a next even number scanning to be scanned.

13 Claims, 2 Drawing Sheets

CIRCUIT FOR RESOLUTION MATCHING

CROSS-REFERENCE TO RELATED APPLICATION

This application makes reference to, incorporates the same herein, and claims all benefits incurring under 35 U.S.C. §119 from an application for Circuit For Resolution Matching filed n the Korean Industrial Property Office on 18 Dec. 1993 and assigned Ser. No. 28372/1993.

BACKGROUND OF THE INVENTION

The present invention relates to an image forming apparatus, and more particularly, to a circuit that will print data in its original size when the resolution of the data received from a host computer does not match the image forming apparatus' primary resolution.

A laser beam printer, as an example of the image forming apparatus, may generally be classified, for example, as a 300 dpi (dots per inch) laser beam printer or a 600 dpi laser beam printer. A 300 dpi laser beam printer comprises a 300 dpi video controller and a 300 dpi laser beam printer engine. A 600 dpi laser beam printer comprises a 600 dpi video controller and a 600 dpi laser beam printer engine. The 300 dpi laser beam printer can print data in 300 dpi after receiving a document written with 300 dpi from a computer. Meanwhile, the 600 dpi laser beam printer generally prints as 600 dpi after receiving a document written with 600 dpi from the computer. Occasionally the 600 dpi laser beam printer will receive a document written with 300 dpi from the computer. In such a case the video controller of the 600 dpi laser beam printer transmits data of 300 dpi to the 600 dpi printer engine, and the frequency of a video clock given and taken between the video controller and the printer engine become equal. Accordingly, the size is reduced by one-half in width and length, respectively. The resulting area becomes a quarter of the size of an actual area thus causing much inconvenience in such a use.

To print the video data of 300×300 dpi as the original size without the above-mentioned problem, the video controller receives data of 300×300 dpi from the computer, and during data processing, or after finishing the data processing, enlarges the video data. Enlargement is performed according to a software method by doubling the data's width and by doubling the data's length in a memory of the video controller. Video controller 100 then receives a horizontal synchronizing signal H_SYN and a video clock V_CLK from an engine part 200 before transferring the video data for printing by the engine part 200. Video controller 100 then serially transmits the video data to the engine part 200, and synchronizes to the signals. Thus, the engine part 200 can print the data of 300 dpi in the original size. However, a problem remains in such a method. That is, in a case where the engine speed is slow, there is no problem in printing the video of 300 dpi according the software enlargement, but in a case where the engine speed is quick, there is much restriction.

SUMMARY OF THE INVENTION

Accordingly, it is an object of the present invention to provide an improved circuit for matching the resolution of data generated by a host computer with the resolution of a printer.

It is another object to provide a circuit for matching resolution before printing so that data having a resolution different from the primary resolution of an image forming apparatus may be printed as an original size.

These and other objects may be achieved according to the principles of the present invention, a circuit for matching resolution of data transmitted from a host computer and an image forming apparatus and for serially transmitting the data to the engine unit. The image forming apparatus uses an engine unit for printing the data on paper and a video controller for synchronizing the data to be printed to a horizontal synchronizing signal and a video clock received from the engine unit, and for serially transmitting the data to the engine unit. The circuit has a transverse direction enlargement portion for generating a second video clock by converting the frequency of the video clock received from the engine unit corresponding to a resolution rate and for providing the second video clock to the video controller, and a longitudinal direction enlargement portion for temporarily storing data of each of the scanning lines to be printed as the even number of scanning lines of the printing engine unit and for providing the stored data to the engine unit as data of respective next even number of scanning lines to be scanned or printed.

BRIEF DESCRIPTION OF THE DRAWINGS

The above-objects and other advantages of the present invention will become more apparent by describing the preferred embodiment of the present invention with reference to the attached drawings, in which.

DETAILED DESCRIPTION OF THE PREFERRED EMBODIMENT

In the following description, numerous specific details are set forth to provide a more thorough understanding of the present invention. It will be apparent, however, to one skilled in the art, that the present invention may be practiced without these specific details. In other instances well known circuits have not been described so as not to obscure the present invention.

Figure 1:
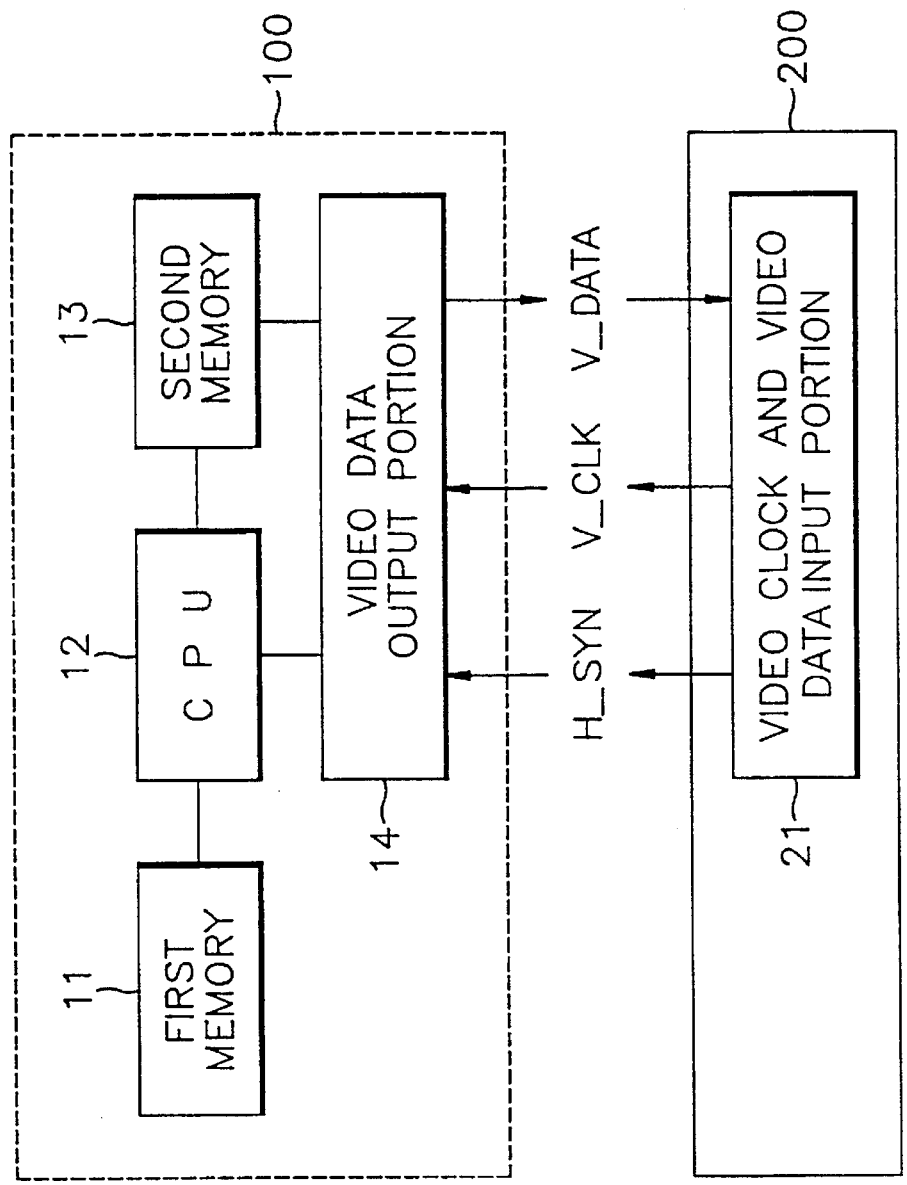
FIG. 1 is a simple diagram of an interface system in an image forming apparatus.

Turning now to the drawings, FIG. 1 is a simple diagram for showing an interface system of an image forming apparatus. A video controller 100 is a main element composed in the image forming apparatus. The video controller 100 receives data, i.e., primary data, to be printed from a host computer, video processes the primary data, and then temporarily stores dot-type video data, made by this video processing, in a first memory 11. Then also, the video controller 100 transmits the video data by one dot in series to the image forming apparatus in sync with a horizontal synchronizing signal H_SYN and a video clock V_CLK provided from an engine part 200 of the image forming apparatus, so that the video data may be printed. But, a horizontal synchronizing signal H_SYN generated by the video controller itself may be used. The engine part 200 of the image forming apparatus provides the data composed of respective dots transferred from the video controller 100, to a structure for printing so that the data may be printed on paper.

In the embodiment of present invention, it is described that the data of which the resolution is half of the primary resolution of an image printing apparatus, i.e., a 600 dpi laser beam printer engine, is received from a host computer, as an example for description convenience. It should be understood that data of other known resolutions can be utilized by the present invention.

When the video controller 100 receives 600 dpi video data from the computer, the video controller 100 transmits the 600 dpi data to be printed to the engine part 200 synchronized to the horizontal synchronizing signal H_SYN and the video clock V_CLK provided from the engine part 200, and the video data can be printed as its original size as written by the primary computer as shown in FIG. 1.

Figure 2:
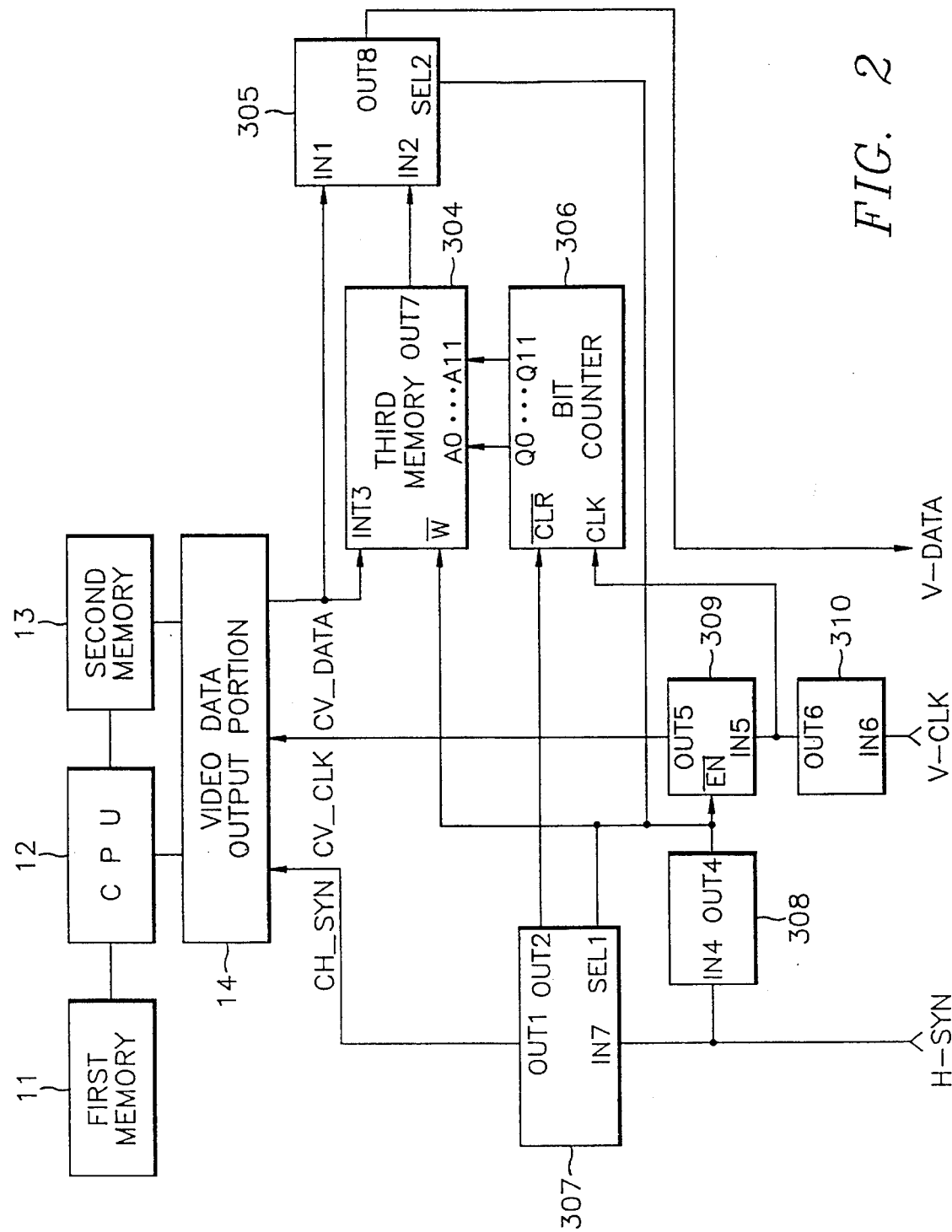
FIG. 2 is a block diagram of a processing circuit before printing in the image forming apparatus according to the present invention.

If the engine part 200 has a resolution of 600 dpi and the video controller 100 receives data written with 300 dpi resolution from the computer however, the video controller 100 of FIG. 2 enlarges the video data twice in width and twice in length before transmitting the data to the enginepart 200 for printing. The detailed construction of the video controller which performs the enlargement is described as follows referring to FIG. 2.

Referring now to FIG. 2, components of the inventive video controller 100 are described. The video controller 100 has a first memory 11 capable of reading and writing, i.e. a random access memory (RAM), a central processing unit (CPU) 12 which is comprised of a microprocessor which controls the video controller 100, and a second memory 13 capable of reading only, i.e. a read only memory (ROM). The second memory 13 stores information for controlling the central processing unit 12 and stores various character fonts to be printed. A video data output part 14 processes the data to be printed, which was transmitted from the computer, and stores the data as a bit image type in the first memory 11 as controlled by the central processing unit 12. Then, synchronized to a horizontal synchronizing signal H_SYN and the video clock V_CLK, the central processing unit 12 reads video data from the first memory 11 and transmits the video data in series directly to a video data input terminal V-DATA of the engine part 200 through the video data output part 14, as shown in FIG. 1. Or, synchronized to a second horizontal synchronizing signal CH_SYN and a second video clock CV_CLK, the central processing unit 12 reads video data from the fast memory 11 and transmits the video data in series from the video data output part 14 through an enlarging circuit, i.e., an output control circuit, to a video data input terminal V-DATA of the engine part 200, as shown in FIG. 2.

A third memory 304 is a random access memory (RAM) of 4096×1 bit. In a multiplexer 305, when a selecting terminal SEL2 is "0", a signal is transmitted from an input terminal IN1 to an output terminal OUT8, and when the selecting terminal SEL2 is "1", the signal is transmitted from an input terminal IN2 to the output terminal OUT8. In a bit counter 306, when a clear terminal $\overline{CLR}$ is "0", output terminals from Q0 to Q11 are "0", and when a signal of leading edge state is inputted to a clock terminal CLK, the count on output terminals Q0 to Q11 is increased by 1. In a data selector 307, e.g., a demultiplexer, when a selector SEL1 is "0", a horizontal synchronizing signal H_SYNC, applied to the input terminal H-SYNC of video controller 100 from engine part 200, is transmitted from an input terminal IN7 to an output terminal OUT1, and when the selector SEL1 is "1", the horizontal synchronizing signal H_SYNC is transmitted from the input terminal IN7 to an output OUT2. In a buffer 309, when an enable terminal $\overline{EN}$ is "0", a signal is transmitted from an input terminal IN5 to an output terminal OUT5, and when the enable terminal $\overline{EN}$ is "1", a signal "1" is generated from the output terminal OUT5. Both dividers 308 and 310 count, respectively, the horizontal synchronizing signal H_SYN and the video clock V_CLK by dividing the signals by 2.

The following describes the processing procedure before printing according to the present invention, with the abovementioned construction. If the video controller 100 receives 300 dpi video data from the computer, since the resolution of input document is different from the resolution of printing apparatus, the video controller 100 changes from a general mode to a preprocessing mode. This preprocessing mode signifies the mode for controlling the preprocessing operation before starting a general printing work, in order to perform the printing without problem, when the resolution of input document is different from the resolution of the printing apparatus.

Referring to the preprocessing operation, since it is well known in the art that by storing the video data at one rate and outputting the video data at another rate the data is either reduced (compressed) or enlarged (expanded), then, in order to transfer one line of data to the engine part 200, enlarged horizontally, a second video dock of about ½ frequency of the primary video clock is provided to the video data output part 14 and enlargement is performed in width. This enlargement is made in the transverse direction, i.e., widthwise, by duplicating each dot or bit to be printed by writing the data into first memory 11 at the rate of the primary clock and reading the data from the first memory 11 at the second video clock rate of about ½ frequency of the primary video clock rate, wherein the duplicate dot or bit is printed next to the original dot or bit.

Additionally, in order for the preprocessing operation to increase the video data in length, the video data of an odd number scanning line, i.e., the printed odd scanning line, is stored in the third memory 304 according to an operation of the bit counter 306. The data is then output from the third memory 304 as a next even number scanning line, i.e., the printed even scanning line, synchronized to the horizontal synchronizing signal H_SYN.

First, the scanning operation of the odd number scanning lines is described as follows. When an output terminal OUT4 of the divider 308 is "0", then a selecting terminal SEL1 of the data selector 307 is "0", and an input terminal IN7 of the data selector 307 is connected to an output terminal OUT1. Accordingly, the horizontal synchronizing signal H_SYN from the engine part 200 is transmitted to the video data output portion 14. This transmitted signal is called a second horizontal synchronizing signal CH_SYN in the present invention for convenience. Also, an input terminal V-CLK provides the video clock V_CLK to divider 310 wherein it is divided by 2. In the buffer 309, at this time, if the input of enable $\overline{EN}$ is "0", the input terminal IN5 is connected to the output terminal OUT5 and the video clock divided by 2 is inputted to the video data output part 14. For convenience, this video clock divided by 2 is called as a second video clock CV_CLK in the present invention. At this time, the video data output part 14 outputs the video data which is to be provided to the printing apparatus so that the printing procedure may be performed. For convenience herewith, this video data is called secondary video data CV_DATA. Since the output terminal OUT4 of divider 308 is a "0", then the selecting terminal SEL2 of multiplexer 305 becomes "0" and the input terminal IN1 is connected to the output terminal OUT8, and whenever two video clocks V_CLK are provided, the secondary video data CV_DATA is serially output to the engine part 200 to be printed as the odd scanning line.

Simultaneously, meanwhile, the secondary video data CV_DATA is applied to a data input terminal INT3 of the third memory 304. Herewith, since a negative recording terminal $\overline{W}$ of the third memory 304 is "0", the applied secondary video data CV_DATA is stored at ½ the frequency of the video clock V_CLK according to addresses provided from the output terminals Q0 to Q11 of the bit counter 306. This stored data will be output to be printed as a next even number scanning line.

Accordingly, the scanning line of the primary data from the host computer is output to the engine part 200 and printed as an odd number scanning line while simultaneously being stored in third memory 304. The scanning line stored in third memory 304, which is a duplicate of the scanning line output to the engine part 200 as an odd number scanning line, is then output to the engine part 200 as the next even number scanning line. Consequently, each scanning line of the 300 dpi host computer is printed twice in the 600 dpi engine part 200, once as an odd number scanning line and then as a next even number scanning line in order to double the size of the image in the longitudinal direction.

The following is a description of the operation for providing the even number scanning line to the input terminal V-DATA of print engine part 200. When the output terminal OUT4 of the divider 308 is "1" then the selecting terminal SEL1 of the data selecting part 307 becomes "1", and the input terminal IN7 is connected to the output terminal OUT2. In the buffer 309, since the enable terminal $\overline{EN}$ is "1", the output terminal OUT5 provides no output signal. Therefore, in the video data output part 14, the second horizontal synchronizing signal CH_SYN and the second video clock CV_CLK are not input and accordingly the secondary video data CV_DATA is not output. However, the output terminal OUT2 of the data selecting part 307 outputs the horizontal synchronizing signal H_SYN thus causing all output terminals Q0 to Q11 of the bit counter 306 become "0". Also a clock ½ the frequency of the video clock V_CLK is applied to the clock terminal CLK of the bit counter 306 and the bit counter 306 starts a count. Accordingly, bit counter 306 provides a count output from output terminals Q0 to Q11 as an address connected with address terminals from A0 to A11 of the third memory 304. Meanwhile, when the negative recording terminal $\overline{W}$ of the third memory 304 becomes "1", the video data of the stored scanning line is output through the output terminal OUT7 of third memory 304, and is transmitted to the input terminal IN2 of the multiplexer 305. At this time, since the selecting terminal SEL2 of the multiplexer 305 is "1", the input terminal IN2 is connected to the output terminal OUT8. Then the video data is input in series to a video data input terminal V-DATA of the engine part 200 in the image forming apparatus to be printed as the even number scanning line.

Preferred embodiments have been described a case wherein 300 dpi video data is printed by a 600 dpi printer engine, in the foregoing description, but to one skilled in the art, various modification can be done without deviating from the range of present invention.

In the present invention as aforementioned, even if the data has resolution different from an original resolution of the image forming apparatus, the data can be printed equally to the primary resolution of image forming apparatus. Accordingly, the present invention has advantages, not only by being able to use the printing apparatus regardless of the resolution of document to be printed, but also has an economic advantage, since there is no need for several different printing apparatus.

What is claimed is:

1. A circuit for matching resolution of data transmitted from a host computer and a resolution of an image forming apparatus, said image forming apparatus including an engine unit for printing said data on paper and a video controller for synchronizing the data to be printed to a horizontal synchronizing signal and a first video clock signal received from said engine unit and for serially transmitting dots of said data to said engine unit, said circuit comprising:

transverse direction enlargement means for generating a second video clock signal by converting the frequency of said first video clock signal received from said engine unit corresponding to the rate of said resolutions and for providing said second video clock signal to said video controller; and longitudinal direction enlargement means for temporarily storing data of an odd number scanning line and for providing the stored data to said engine unit as data of a next even number scanning line.

2. The circuit for matching resolutions as claimed in claim 1, wherein said transverse direction enlargement means comprises a divider for dividing by two said video clock signal to generate said second video clock signal and to provide said second video clock signal to said video controller.

3. The circuit for matching resolutions as claimed in claim 2, wherein said longitudinal direction enlargement means comprises:

memory means for temporarily storing a second video data of an odd number scanning line in a prescribed address synchronizing to said second video clock signal, and for providing said second video data to said engine unit when the video data of even number scanning line is scanned;

count means initiated by the horizontal synchronizing signal, for counting said second video clock signal and for supplying the counted value as an address to said memory means; and means for blocking the supply routes of said horizontal synchronizing signal and said video clock signal from said engine unit to said video controller in response to the signal generated by dividing by two said horizontal synchronizing signal during the scanning of the even number.

4. An apparatus for matching resolutions of data transmitted from a host computer and an of an image forming means, said apparatus comprising:

a first memory means for receiving said data transmitted from said host computer;

data output means for outputting said data stored in said first memory means as one of an original resolution data and an expanded resolution data, said original resolution data being output when the resolution of the data transmitted from said host computer matches the resolution of said image forming means, said expanded resolution data being output when the resolution of the data transmitted from said host computer differs from the resolution of said image forming means;

first divider means for receiving a horizontal synchronizing signal from said image forming means and outputting a divided horizontal synchronizing signal;

demultiplexing means for receiving said horizontal synchronizing signal from said image forming means, and, in response to said divided horizontal synchronizing signal, outputting said horizontal synchronizing signal to said data output means or a clear input terminal of a bit counter means;

second divider means for receiving a video clock signal from said image forming means and outputting a divided video clock signal, said divided video clock signal being input to a clock input terminal of said bit counter means;

means for enabling said divided video clock signal to be supplied to said data output means in response to said divided horizontal synchronizing signal;

second memory means for storing a predetermined line of data output by said data output means in response to said divided horizontal synchronizing means and according to address data provided by said bit counter means, said address data being generated by said bit counter means in response to said divided video clock signal input to said clock input terminal; and multiplexing means having a first input for receiving data output from said data output means, a second input for receiving data output by said second memory means, a selecting terminal for receiving said divided horizontal synchronizing signal and an output terminal for providing data received at one of said first and second inputs to said image forming apparatus in response to said divided horizontal synchronizing signal.

5. The apparatus as set forth in claim 4, wherein said multiplexing means provides only the data received at said first input to said image forming means when said resolution of the data transmitted from said host computer matches the resolution of said image forming means.

6. The apparatus as set forth in claim 5, wherein said multiplexing means provides the data received at said first input to said image forming means when said divided horizontal synchronizing signal has a first logic value and outputs the data received at said second input to said image forming means when said divided horizontal synchronizing signal has a second logic value, when said resolution of the data transmitted from said host computer differs from the resolution of said image forming means.

7. The apparatus as set forth in claim 6, wherein said second memory means serially stores a data of an odd scanning line and serially outputs said data of said odd scanning line as data of a next even scanning line.

8. The apparatus as set forth in claim 4, wherein said multiplexing means provides the data received at said first input to said image forming means when said divided horizontal synchronizing signal has a first logic value and outputs the data received at said second input to said image forming means when said divided horizontal synchronizing signal has a second logic value, when said resolution of the data transmitted from said host computer differs from the resolution of said image forming means.

9. The apparatus as set forth in claim 8, wherein said second memory means serially stores a data of an odd scanning line and serially outputs said data of said odd scanning line as data of a next even scanning line.

10. An interface apparatus for an image forming device printing at a first resolution images represented by print data, said interface apparatus comprising:

data processing means for converting primary data into bit image form;

first memory means for storing said primary data in said bit image form in response to a first video clock signal having a first video clock rate;

central processing means for controlling reading of said primary data, serially, from said first memory means in response to said first video clock signal when said primary data has said first resolution and for controlling reading of said primary data, serially, from said first memory means in response to a second video clock signal having a second video clock rate when said primary data has a second resolution, said second resolution being different from said first resolution;

second memory means for storing processing control information for controlling said central processing means and for storing character fonts;

third memory means for storing print data of a scanning line read from said first memory means through said data processing means when said primary data has said second resolution;

output control means for controlling writing of said print data into said third memory means and for controlling reading of said print data from said third memory means in response to a horizontal synchronizing signal and said first video clock signal, said output control means generating a switching signal to alternating between a first logic value and a second logic value; and multiplexing means having an output terminal, a first input terminal connected to a data output terminal of said data processing means for selectively supplying said print data for the scanning line read from said first memory means to said output terminal, and a second input terminal connected to said third memory means for selectively supplying the stored data of a scanning line read from said third memory means to said output terminal;

said multiplexing means being responsive to said switching signal exhibiting said first logic value generated by connecting said first input terminal to said output terminal;

said multiplexing means being responsive to said switching signal having said second logic value generated by said output control means for connecting said second input terminal to said output terminal; and said output terminal of said multiplexing means being connected to provide said data to said image forming device while said primary data exhibits said first resolution in a sequence of a plurality of line of said print data from said first input terminal interleaved with a plurality of lines of said print data from said second input terminal, and while said primary data exhibits said second resolution providing said data to said image forming device with said print data from said first input terminal being repeated in a plurality of successive lines;

said image forming device being further connected to said data processing means for printing said data read from said first memory means in response to said first video clock signal when said primary data has said first resolution.

11. The interface of claim 10, said third memory means having a capacity for storing data for one horizontal line.

12. A method for matching resolution of data transmitted from a host computer and a resolution of an image forming apparatus, said image forming apparatus including an engine unit for printing said data on paper and a video controller for synchronizing the data to be printed to a horizontal synchronizing signal and a video clock signal received from said engine unit and for serially transmitting dots of said data to said engine unit, said method comprising the steps of:

generating a second video clock signal by converting the frequency of said video clock signal received from said engine unit corresponding to the rate of said resolutions and for providing said second video clock signal to said video controller;

temporarily storing data of an odd number scanning line; and outputting the stored data to said engine unit as data of a next even number scanning line.

13. The method as set forth in claim 12, said step of generating a second video comprises:

dividing said video clock signal by two to generate said second video clock signal; and providing said second video clock signal to said video controller.

* * * * *